(12) United States Patent
Ren (10) Patent No.: US 12,525,679 B2
(45) Date of Patent: Jan. 13, 2026

(54) WIRE HARNESS ISOLATION PLATE INCLUDING LIMIT STRUCTURE AND BATTERY MODULE

(71) Applicant: EVE POWER CO., LTD., Hubei (CN)

(72) Inventor: Chaoju Ren, Hubei (CN)

(73) Assignee: EVE POWER CO., LTD., Jingmen (CN)

( * ) Notice: Subject to any disclaimer, the term of this patent is extended or adjusted under 35 U.S.C. 154(b) by 513 days.

(21) Appl. No.: 18/002,865

(22) PCT Filed: Oct. 18, 2022

(86) PCT No.: PCT/CN2022/125979
§ 371 (c)(1),
(2) Date: Dec. 22, 2022

(87) PCT Pub. No.: WO2023/151307
PCT Pub. Date: Aug. 17, 2023

(65) Prior Publication Data
US 2024/0113378 A1 Apr. 4, 2024

(30) Foreign Application Priority Data
Feb. 11, 2022 (CN) .......................... 202220278058.2

(51) Int. Cl.
*H01M 50/298* (2021.01)
*H01M 50/503* (2021.01)
(Continued)

(52) U.S. Cl.
CPC ....... *H01M 50/298* (2021.01); *H01M 50/503* (2021.01); *H01M 50/507* (2021.01); *H01M 50/569* (2021.01)

(58) Field of Classification Search
CPC ............ H01M 50/298; H01M 50/503; H01M 50/507; H01M 50/569; H01M 2220/20;
(Continued)

(56) References Cited

FOREIGN PATENT DOCUMENTS

| CN | 210129548 U | 3/2020 |
| CN | 213242865 U | 5/2021 |

(Continued)

OTHER PUBLICATIONS

Yang et al., CN 113937404A; Espacenet machine translation, 2022 (Year: 2022).*

(Continued)

*Primary Examiner* — Adam A Arciero
(74) *Attorney, Agent, or Firm* — PV IP PC; Wei Te Chung (57) ABSTRACT

The present disclosure discloses a battery module and a wire harness isolation plate disposed on the battery cell module and including a plurality of battery cells and a plurality of busbars, each of the busbars connect with at least two battery cells in the battery cell module, and a first electrode and a second electrode of each of the battery cells is disposed on a same side of the battery cell; the wire harness isolation plate includes a first fixed unit including a first fixed plate, a first side of the first fixed plate is configured to position the busbar, a second side of the first fixed plate is configured to position an end of the battery cell provided with the first electrode and the second electrode and to expose a part of the first electrode and a part of the second electrode of the battery cell.

20 Claims, 5 Drawing Sheets

(51) Int. Cl.
*H01M 50/507* (2021.01)
*H01M 50/569* (2021.01)

(58) Field of Classification Search
CPC .. H01M 50/258; H01M 50/264; H01M 50/50; H01M 50/593; H01M 50/213
See application file for complete search history.

(56) References Cited

FOREIGN PATENT DOCUMENTS

| CN | 113937404 A | 1/2022 |
| CN | 217158501 U | 8/2022 |
| JP | 2004171856 A | 6/2004 |

OTHER PUBLICATIONS

Guo et al., CN 210129548, Espacenet machine translation, 2020 (Year: 2020).*
International Search Report in International application No. PCT/CN2022/125979, mailed on Jan. 12, 2023.
Written Opinion of the International Search Authority in International application No. PCT/CN2022/125979, mailed on Jan. 12, 2023.

* cited by examiner

WIRE HARNESS ISOLATION PLATE INCLUDING LIMIT STRUCTURE AND BATTERY MODULE

CROSS-REFERENCE TO RELATED APPLICATIONS

This application is a National Stage Appl. filed under 35 USC 371 of International Patent Application No. PCT/CN2022/125979 with an international filing date of Oct. 18, 2022, designating the United States, now pending, and further claims priority to Chinese Patent Application No. 202220278058.2, filed on Feb. 11, 2022, which is incorporated by reference in the present application in its entirety.

TECHNICAL FIELD

The present disclosure relates to the field of power battery, for example, relates to a wire harness isolation plate and a battery module.

BACKGROUND

A battery module includes a plurality of battery cells, and the battery cells are connected in series or parallel through a busbar. When the battery cells in a battery module are subjected to an external force such as vibration on the casing, a short circuit occurs due to a contact between adjacent battery. In addition, a busbar is connected to the battery cell, and a connection therebetween is unstable. The short circuit is easy to occur between different busbars, and between the busbar and the battery cell. In related technologies, an insulation structure is generally applied for insulation between the battery cells, between the busbars, and between the busbar and the battery cell. However, it is difficult to make the insulation structure, which increases the cost. In addition, the battery module has a plurality of battery cells and a plurality of busbars, and a number of components is large, resulting in low assembly efficiency.

SUMMARY

The present disclosure provides a wire harness isolation plate and a battery module. The wire harness isolation plate can provide an insulated isolation between busbars, between battery cells, and between the busbars and the battery cells, so that a structure of the battery module is stable and simple. The harness isolation plate is configured to integrate the busbar, which is conducive to an integrated design of cells contact system (CCS) assembly and improves a grouping efficiency of the busbars.

In a first aspect, an embodiment of the present disclosure provides a harness isolation plate, the wire harness isolation plate is disposed on a battery cell module, the battery cell module includes a plurality of battery cells and a plurality of busbars, each of the busbars is configured to connect with at least two battery cells in the battery cell module, and a first electrode and a second electrode of each of the battery cells is disposed on a same side of the battery cell; wherein the wire harness isolation plate includes a first fixed unit, the first fixed unit includes a first fixed plate, a first side of the first fixed plate is configured to position the busbar, a second side of the first fixed plate is configured to position an end of the battery cell provided with the first electrode and the second electrode and to expose a part of the first electrode and a part of the second electrode of the battery cell.

In an embodiment, a plurality of battery cell limit slots are defined on the second side of the first fixed plate, each of the battery cell limit slots is configured to position a corresponding one of the battery cells, and further to position an end of the corresponding one of the battery cells provided with the first electrode and the second electrode, and a notch shape of the battery cell limit slot is matched with a shape of an end of the battery cell provided with the first electrode and the second electrode.

In an embodiment, a gap is defined on a bottom of the battery cell limit slot, a part of the second electrode of the battery cell disposed in the battery cell limit slot is exposed from the gap, wherein the bottom of the battery cell limit slot is connected with a first isolation portion, a through hole is defined on the first isolation portion, and the through hole is configured to expose the first electrode of the battery cell disposed in the battery cell limit slot.

In an embodiment, the battery cell is a cylindrical battery cell, and a shape of the battery cell limit slot is circular or arcuate.

In an embodiment, an internal diameter of the battery cell limit slot is greater than an external diameter of the battery cell.

In an embodiment, wire harness isolation plate of claim 1, wherein a plurality of busbar limit slots are defined on a first side of the first fixed plate, and each of the plurality of busbar limit slots is configured to position the busbar.

In an embodiment, wire harness isolation plate of claim 6, wherein a rib is arranged between adjacent busbar limit slots.

In an embodiment, the first fixed unit further include a first positioning column disposed on a bottom of the busbar limit slot, and a first mounting hole is defined on the busbar for sleeving on the first positioning column; or
the first fixed unit further includes a positioning hole defined on the bottom of the busbar limit slot, the busbar is provided with a mounting column, and the positioning hole is configured to be sleeved on the mounting column.

In an embodiment, the wire harness isolation plate further includes a second fixed unit, wherein the second fixed unit is connected to the first fixed plate, and the second fixed unit is configured to fix an output-stage conductive bar connected to the plurality of busbars.

In an embodiment, the second fixed unit includes a second fixed plate connected to the first fixed plate, the second fixed plate is configured to fix the output-stage conductive bar, the second fixed unit further includes a second positioning column fixed on the second fixed plate, and a second mounting hole is defined on the output-stage conductive bar for sleeving on the second positioning column.

In an embodiment, the wire harness isolation plate further includes a third fixed unit, wherein the third fixed unit is connected to the first fixed plate, the third fixed unit is configured to fix a connector, and the third fixed unit is configured to fix a flexible circuit board by the connector, wherein a side of the first fixed plate away from the battery cell is configured to dispose the flexible circuit board.

In an embodiment, the third fixed unit include a third fixed plate fixed on the first fixed plate, and the third fixed plate is configured to clamp the connector.

In an embodiment, the first fixed plate is connected with a fourth fixed plate, the output-stage conductive bar connected with the plurality of busbars is extended to the fourth fixed plate, and the fourth fixed plate is embedded with a fastener.

In an embodiment, the first fixed plate is provided with an installation hole, and the installation holes are configured to fix an upper cover of a battery module.

In an embodiment, the wire harness isolation plate further includes:
- a second fixed unit, wherein the second fixed unit is connected to the first fixed plate, the second fixed unit is configured to fix an output-stage conductive bar connected to the plurality of busbars; and
- a third fixed unit, wherein the third fixed unit is connected to the first fixed plate, the third fixed unit is configured to fix a connector, the third fixed unit is further configured to fix a flexible circuit board by the connector, and a side of the first fixed plate away from the battery cell is configured to dispose the flexible circuit board;
- wherein the first fixed unit, the second fixed unit and the third fixed units are integrated.

In a second aspect, an embodiment of the present disclosure provides a battery module, including the above wire harness isolation plate, the battery cell, the busbar, an output-stage conductive bar, a flexible circuit board, and a connector, wherein the battery cell module, the busbar, the output-stage conductive bar, the flexible circuit board, and the connector are arranged on the wire harness isolation plate.

Beneficial effects of the present disclosure are as following:

A wire harness isolation plate and a battery module are provided. The first fixed plate is provided to position all the battery cells on the battery cell module, so that each battery cell can be installed stably, and a short circuit caused by a contact between the battery cells can be avoided. The first fixed unit fixes the busbar by the connecting element on the busbar, so that the busbar can be installed stably and avoid a short circuit caused by a contact between adjacent busbars. The busbar and the battery cell are arranged on respective sides of the first fixed plate to avoid a short circuit caused by a contact among the busbar, the first electrode and the second electrode of a same battery cell at the same time. It is unnecessary to apply an additional insulation structure to provide insulation between the battery cells, between the busbars, and between the busbars and the battery cells, thereby simplifying the structure and reducing the cost. During a production process, a plurality of busbars may be installed on the harness isolation plate through the first fixed unit to define a harness module, and then the harness module and the battery cells are assembled, which is conducive to make an integrated design. For the battery module, materials may be fed to the harness module, and then the harness module is installed on the battery cell module to define a battery module, which is convenient for installation, improves a grouping efficiency, and makes mass production simple, fast, and efficient.

REFERENCE NUMERALS

100: battery cell; 101: first electrode; 102: second electrode; 200: busbar; 201: connecting element; 2011: first electrode connection portion; 2012: intermediate connection portion; 2013: second electrode connection portion;

1: first fixed unit; 11: first fixed plate; 111: battery cell limit slot; 1111: gap; 112: busbar limit slot; 113: rib; 114: first positioning column; 115: first isolation portion; 116: mounting table; 1161: installation hole; 117: second isolation portion; 117: arc-shaped groove;

2: second fixed unit; 21: second fixed plate; 22: second positioning column;

3: third fixed unit; 31: third fixed plate; 32: buckle;

4: fourth fixed unit; 41: fastener;

5: output-stage conductive bar;

6: connector;

7: flexible circuit board.

DETAILED DESCRIPTION OF THE EMBODIMENTS

In the description of the present application, unless otherwise specified and limited, the term "connected to each other", "connected" or "fixed" is to be construed in a broad sense, for example, as fixedly connected, detachably connected, or integrated; mechanically connected or electrically connected; directly connected to each other or indirectly connected to each other via an intermediary; or internally connected between two elements or interactional between two elements. Meanings of the preceding terms in the present application may be understood according to situations.

In the present application, unless otherwise specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

An embodiment of the present disclosure provides a battery module, wherein the battery module includes a battery cell 100, a busbar 200, an output-stage conductive bar 5, a flexible circuit board 7, a connector 6 connected to the flexible circuit board 7, and a wire harness isolation plate. The wire harness isolation plate is arranged on a battery cell module. The battery cell module includes a plurality of the battery cells 100 and a plurality of the busbars 200. Any one of the busbars 200 is configured to connect with at least two of the battery cells 100 in the battery cell module. A first electrode 101 and a second electrode 102 of the battery cell 100 are disposed on a same side of the battery cell 100.

The embodiment of the present disclosure provides the wire harness isolation plate arranged on the battery cell module, and the wire harness isolation plate includes a first fixed unit 1. As shown in FIG. 1 to FIG. 4, the first fixed unit 1 includes a first fixed plate 11, a first side of the first fixed plate 11 is configured to position the busbar 200, and a second side of the first fixed plate 11 is configured to position an end of the battery cell 100 with an electrode. A part of the first electrode 101 and a part of the second electrode 102 in each of the battery cells 100 are exposed from the first fixed plate 11.

Figure 4:
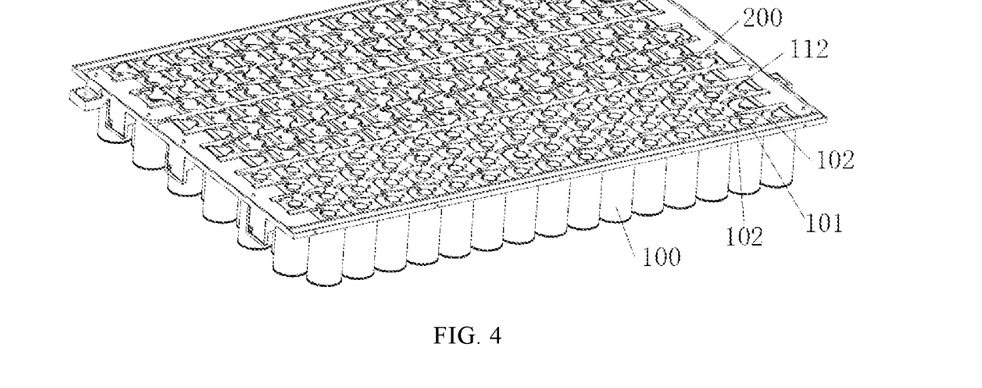
FIG. 4 is a schematic structural diagram of a battery cell and a busbar disposed on a wire harness isolation plate provided by an embodiment of the present disclosure.
Figure 5:
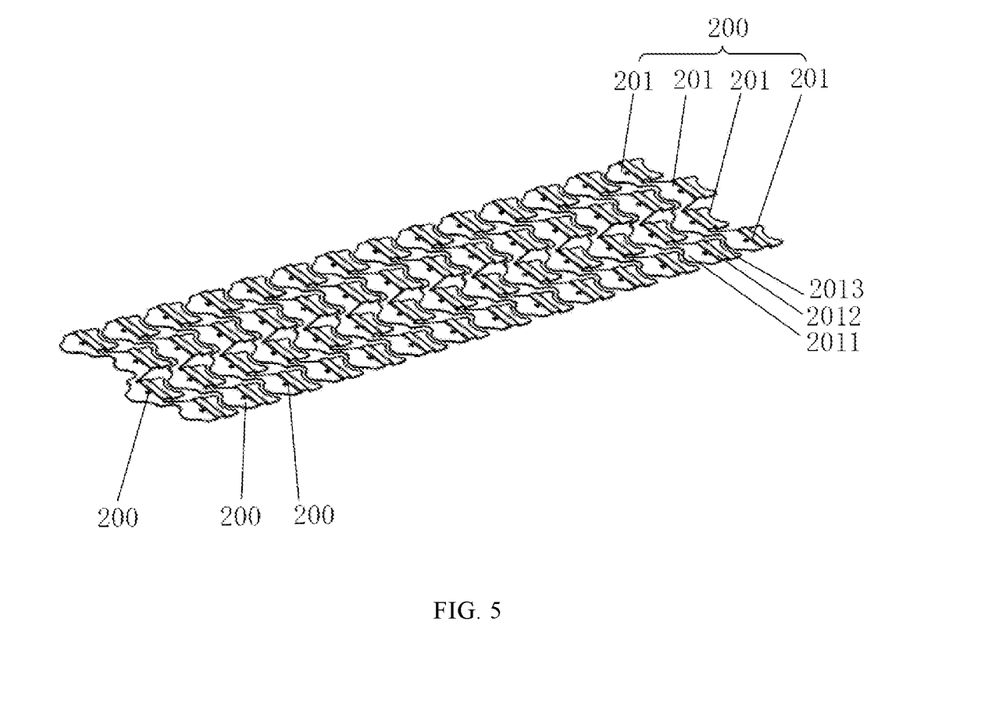
FIG. 5 is a schematic structural diagram of a plurality of busbars provided by an embodiment of the present disclosure.

As shown in FIG. 5, the busbar 200 includes a plurality of connecting elements 201, the connecting elements 201 are configured to connect adjacent battery cell 100 in series along a first direction. Each of the connecting elements 201 includes a first electrode connection portion 2011 connected to the first electrode 101 of one of the battery cells 100, a second electrode connection portion 2013 connected to the second electrode 102 of another one of the battery cells 100, and an intermediate connection portion 2012 connected the first electrode connection portion 2011 and the second electrode connection portion 2013. As shown in FIG. 4 and FIG. 5, the first electrode connection portion 2011 of the connecting element 201 is connected to the first electrode 101 exposed from the first fixed plate 11 of one of the adjacent battery cells 100, and the second electrode connection portion 2013 of the connecting element 201 is connected to the second electrode 102 exposed from the first fixed plate 11 of another one of the adjacent battery cells 100.

The first fixed plate 11 is provided to position all the battery cells 100 on the battery cell module, so that each of the battery cells 100 can be installed stably, and a short circuit caused by a contact between the battery cells 100 can be avoided. The first fixed unit 1 may fix the busbar 200 by fixing all of the connecting elements 201 on the busbar 200, so that the busbar 200 can be installed stably and avoid a short circuit caused by a contact between adjacent busbars 200. The busbar 200 and the battery cell 100 are arranged on respective sides of the first fixed plate 11 to avoid a short circuit caused by a contact among the busbar 200, and the first electrode 101 and the second electrode 102 of a same battery cell 100 at the same time. It is unnecessary to apply an additional insulation structure to provide insulation between the battery cells 100, between the busbars 200, and between the busbar 200 and the battery cell 100, thereby simplifying the structure and reducing the cost.

During a production process, the plurality of the busbars 200 may be installed on the harness isolation plate through one or more of the first fixed units 1 to define a harness module, and then the harness module and the battery cells 100 are assembled, which is conducive to make an integrated design. For the battery module, materials may be fed to the harness module, and then the harness module is installed on the battery cell module to define a battery module, which is convenient for installation, improves a grouping efficiency, and makes mass production simple, fast, and efficient.

A part of the first electrodes 101 and a part of the second electrodes 102 of the battery cell 100 are exposed from the first fixed plate 11, so that the exposed first electrodes 101 and the exposed second electrodes 102 are connected to adjacent connecting elements 201 in the first direction respectively, so as to achieve a serial connection of two adjacent battery cells 100 in the first direction. In the embodiment, the first electrode 101 is a positive electrode and the second electrode 102 is a negative electrode.

The flexible circuit board 7 is arranged on a side of the first fixed plate 11 away from the battery cell 100, thereby realizing an isolation between the flexible circuit board 7 and the battery cell 100.

Figure 1:
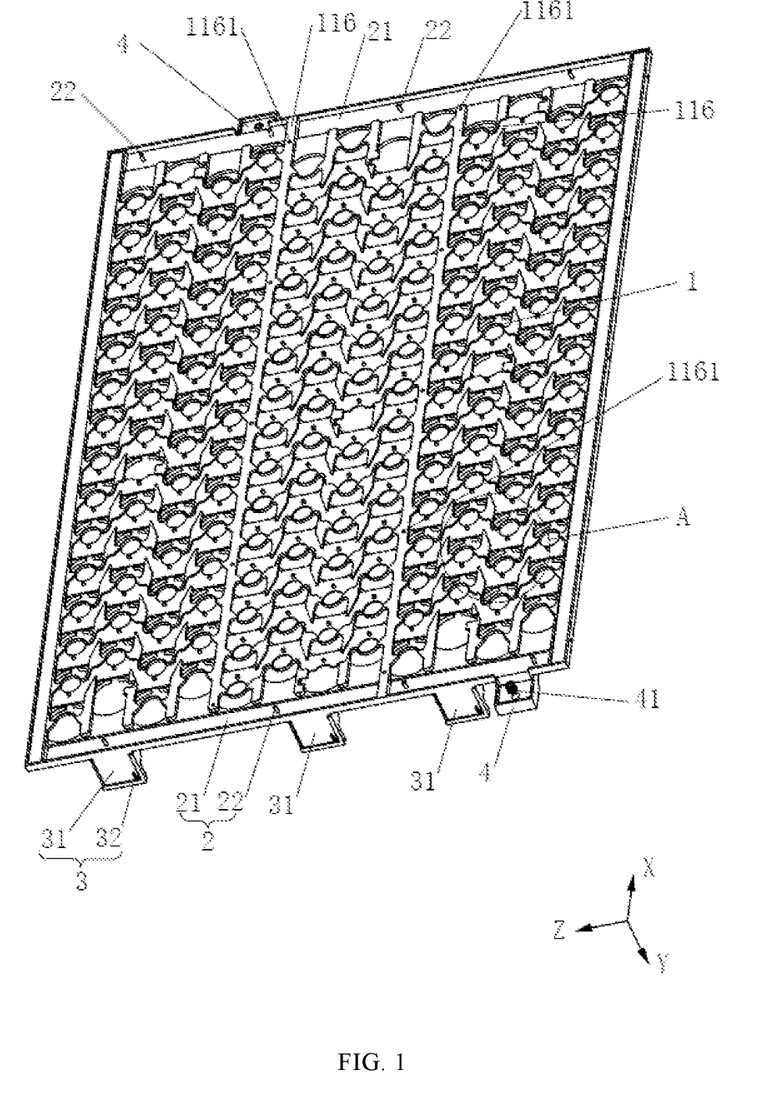
FIG. 1 is a schematic structural diagram of a harness isolation plate provided by an embodiment of the present disclosure.

As shown in FIG. 1, the first fixed unit 1 is designed according to an overall size of the battery cell module, an arrangement of the plurality of battery cells in the battery cell module, and the like, so that the first fixed unit 1 defines an integrated structure to be directly installed on the battery cell module, thereby simplifying an assembly process.

Optionally, the battery cell 100 may be a cylindrical battery cell or a square battery cell.

In the embodiment, as shown in FIG. 1, the first direction is an X direction, a second direction is a Y direction, a third direction is a Z direction, and any two of the third direction, the second direction, and the first direction are perpendicular to each other.

The busbar 200 and the output-stage conductive bar 5 are made of conductive materials, and generally may be made of aluminum or copper.

Figure 3:
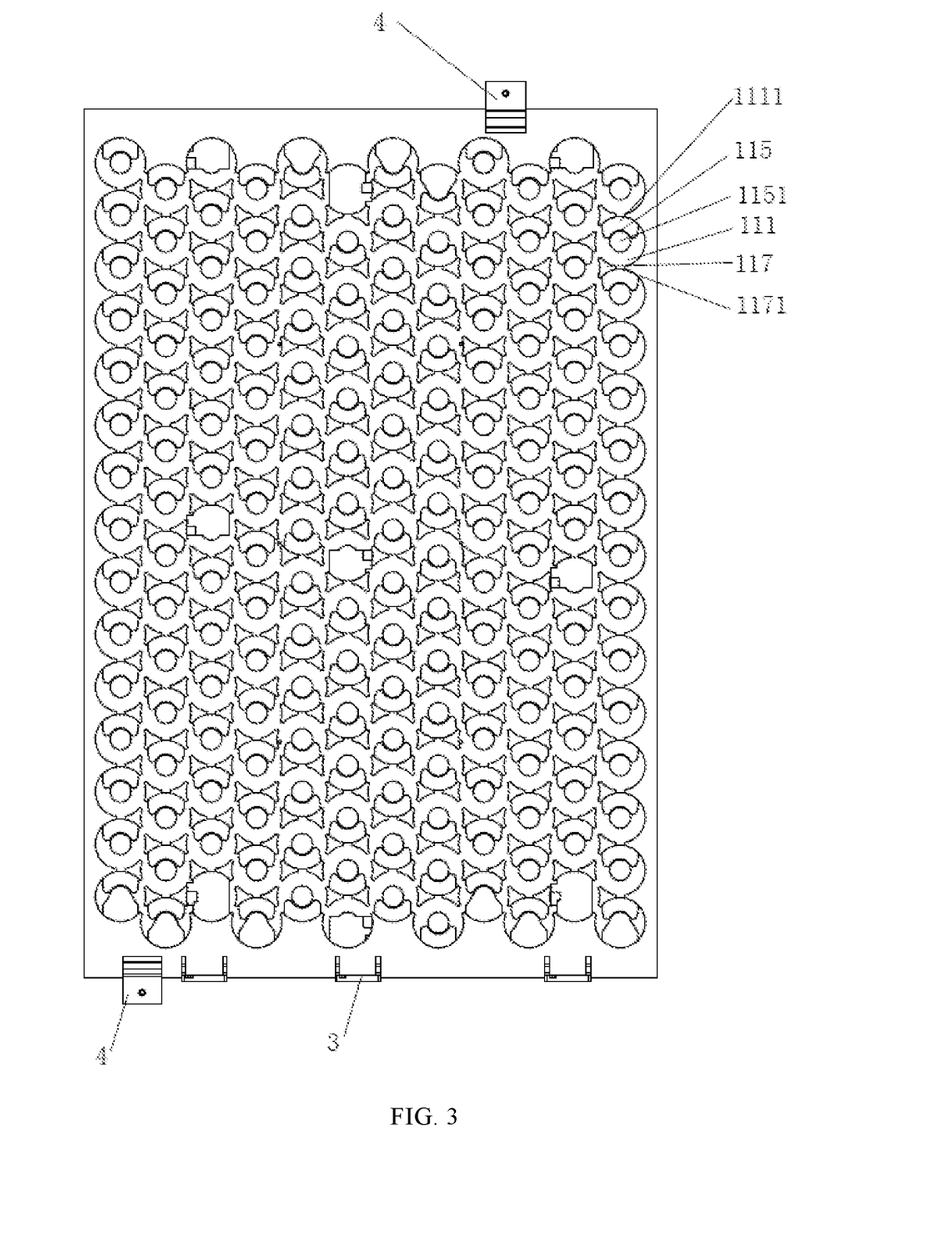
FIG. 3 is a bottom view of a harness isolation plate provided by an embodiment of the present disclosure.

Optionally, as shown in FIG. 3, a plurality of battery cell limit slots 111 are defined in the second side of the first fixed plate 11, each of the battery cell limit slots 111 positions a corresponding one of the battery cells 100, the end of the battery cell with the electrode is correspondingly arranged in the battery cell limit slot 111, and the battery cell limit slot 111 is matched with a shape of the end of a corresponding one of the battery cells 100 with the electrode. In the embodiment, the battery cell 100 is the cylindrical battery cell, correspondingly, a notch of the battery cell limit slot 111 is circular or arc shaped, thereby making a wall of the battery cell limit slot 111 is attached to a partial periphery of the cylindrical battery cell.

Optionally, a gap 1111 is defined in a slot bottom of the battery cell limit slot 111. A part of the second electrode 102 is exposed from the gap 1111, and the other part of the second electrode 102 is covered by the slot bottom of the battery cell limit slot 111. The slot bottom of the battery cell limit slot 111 is connected with a first isolation portion 115, a through hole 1151 is defined in the first isolation portion 115, and the first electrode 101 is exposed from the through hole 1151. A short circuit between the first electrode 101 and the second electrode 102 in a same battery cell 100 can be avoided by providing the first isolation portion 115. That is, after the first electrode connection portion 2011 of one of the connecting elements 201 is connected to the first electrode 101 of the battery cell 100 (hereinafter referred to as a first battery cell for convenience of description) through the through hole 1151, the intermediate connection portion 2012 of the one of the connecting elements 201 is disposed on a slot bottom wall of the busbar limit slot 112 corresponding to the first battery cell (that is, the slot bottom wall of the busbar limit slot 112 separates the intermediate connection portion 2012 of the of the one of the connecting elements 201 from the second electrode 102 of the first battery cell), thus the one of the connecting elements 201 is separated from the second electrode 102 of the first battery cell. When the second electrode connection portion 2013 of the one of the connecting elements 201 is connected to the second electrode 102 of a second battery cell, an end of a side of the first electrode 101 of the second battery cell close to the second electrode 102 is surrounded by a hole wall of the through hole 1151. Thus, a connection between the second electrode connection portion 2013 of the one of the connecting elements 201 and the first electrode 101 of the second battery cell is avoided, so as to realize that the connecting element 201 can not be connected to the first electrode 101 and the second electrode 102 of the second battery cell at the same time. A shape of the first isolation portion 115 is designed according to a structure of the first electrode 101 and the second electrode 102. For example, when the second electrode 102 surrounds a periphery of the first electrode 101, and the first electrode 101 protrudes from the second electrode 102, the first isolation portion 115 may be annular and sleeved around the first electrode 101.

Figure 2:
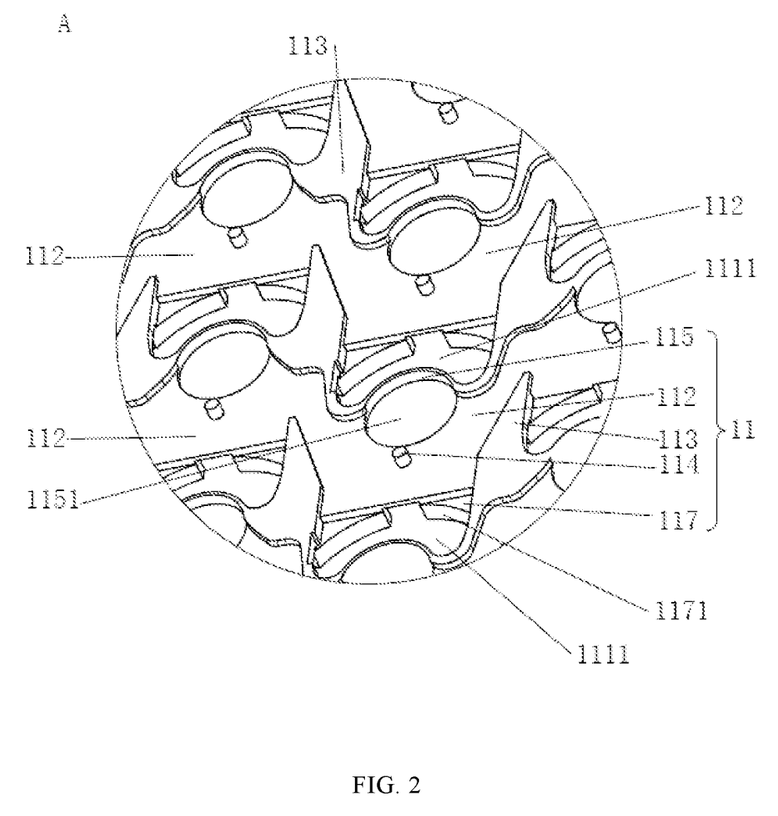
FIG. 2 is an enlarged view of A in FIG. 1.

As shown in FIG. 2, the first fixed plate 11 further includes a second isolation portion 117 arranged on an outer wall of the battery cell limit slot 111. An arc slot 1171 is defined in the second isolation portion 117, and the arc slot 1171 is configured to position adjacent cylindrical battery cells.

Optionally, as shown in FIG. 3, when the battery cell 100 is a cylindrical battery cell, a notch of the battery cell limit slot 111 is circular to match with a shape of the battery cell 100, and the slot wall is fully attached on a peripheral wall of the battery cell 100. Alternatively, a gap is defined in the slot wall, a shape of the notch is a circular arc, and a part of the slot wall is attached to a part of the peripheral wall of the battery cell 100. An internal diameter of the battery cell limit slot 111 is greater than an external diameter of the battery cell 100. An advantage of this design is that a dimensional tolerance of the battery cell 100, and a dimensional tolerance defined by the battery cells 100 stacked may be allowed, so as to maintain relative positions between the battery cells 100, which provides early guarantee for accurate positioning of the busbars 200, and ensures a feasibility of assembly. Optionally, a difference between the internal diameter of the battery cell limit slot 111 and the external diameter of the battery cell 100 ranges from 0.8 mm to 1.2 mm, for example, it may be 1 mm.

Optionally, a plurality of busbar limit slots 112 are defined in the first side of the first fixed plate 11, and the plurality of busbar limit slots 112 are configured to position and limit the plurality of busbars 200. The connecting elements 201 of the busbar 200 is arranged in the busbar limit slot 112. A part of a main body of the connecting element 201 is located in the busbar limit slot 112 (for example, the intermediate connection portion 2012 of the connecting element 201 is located in the busbar limit slot 112). A shape of the busbar limit slot 112 is matched with a shape of the connecting element 201, so that a plurality of connecting elements 201 of the busbar 200 can be limited respectively to achieve a positioning effect of the busbar 200, thereby improving an installation stability.

A rib 113 is arranged between adjacent busbar limit slots 112. The rib 113 is configured to insulate and isolate adjacent busbars 200, thereby ensuring safe electrical clearance and creepage distance maintained between the busbars 200.

A slotting size of the busbar limit slot 112 is greater than an overall size of the connecting element 201. A difference between the slotting size of the busbar limit slot 112 and the overall size of the connecting element 201 ranges from 0.3 mm to 1 mm, which can ensure a normal assembly size of the connecting element 201 within a tolerance range.

Optionally, the first fixed unit 1 further includes a first positioning column 114 fixed on a slot bottom of the busbar limit slot 112, a first mounting hole sleeving the first positioning column 114 is defined in the busbars 200, and an assembly accuracy is improved by positioning the busbar 200 by the first positioning column 114. The first mounting hole is defined in the connecting element 201. In addition, after positioning the busbar 200 by the first positioning column 114, the first positioning column 114 is hot melted to fix the busbar 200 on the first fixed plate 11. The first positioning column 114 is a cylindrical column, which is convenient for installation. An external diameter of the cylindrical column ranges from 2 mm to 5 mm, which ensures a sufficient structural strength. In other embodiments, the first fixed unit 1 may also include a positioning hole defined in a slot bottom of the busbar limit slot 112, and a mounting column is provided on the busbar 200 (in the embodiment, on the connecting element 201). As such, the positioning hole is sleeved on the mounting column, and the busbar 200 is positioned by the positioning hole.

Optionally, as shown in FIG. 1, the wire harness isolation plate further includes a second fixed unit 2, and the second fixed unit 2 is connected to the first fixed plate 11. The second fixed unit 2 is configured to fix the output-stage conductive bar 5 connected to the busbar 200. The second fixed unit 2 is configured to fix the output-stage conductive bar 5. In the embodiment, the wire harness isolation plate includes two second fixed units 2, the two second fixed units 2 are connected to respective ends of the first fixed plate 11 along the first direction. One of two output-stage conductive bars 5 is connected to one of the two second fixed plates 2, and the other of the two output-stage conductive bars 5 is connected to the other of the two second fixed plates 2. The battery cell 100 and the busbar 200 are arranged on respective sides of the first fixed plate 11 along the second direction.

Optionally, the second fixed unit 2 includes a second fixed plate 21 connected to the first fixed plate 11, the output-stage conductive bar 5 is fixed on the second fixed plates 21, and the second fixed plate 21 is configured to support the output-stage conductive bar 5. The second fixed unit 2 includes a second positioning column 22 fixed on the second fixed plate 21. A second mounting hole configured to sleeve the second positioning column 22 is defined in the output-stage conductive bar 5. The second positioning column 22 positions the output-stage conductive bar 5 to improve an assembly accuracy. In addition, after the second positioning column 22 position the output-stage conductive bar 5, the second positioning column 22 is hot melted, and the output-stage conductive bar 5 is fixed on the second fixed plate 21 through the second positioning column 22. The second positioning column 22 is cylindrical column, which is convenient for installation. An external diameter of the cylindrical column ranges from 2 mm to 5 mm, which ensures sufficient structural strength.

As shown in FIG. 1, the wire harness isolation plate may be provided with a plurality of first positioning columns 114 and a plurality of second positioning columns 22. The spaces among the plurality of first positioning columns 114 and the spaces among the plurality of second positioning columns 22 may be determined according to an actual situation, which is not limited herein.

Figure 6:
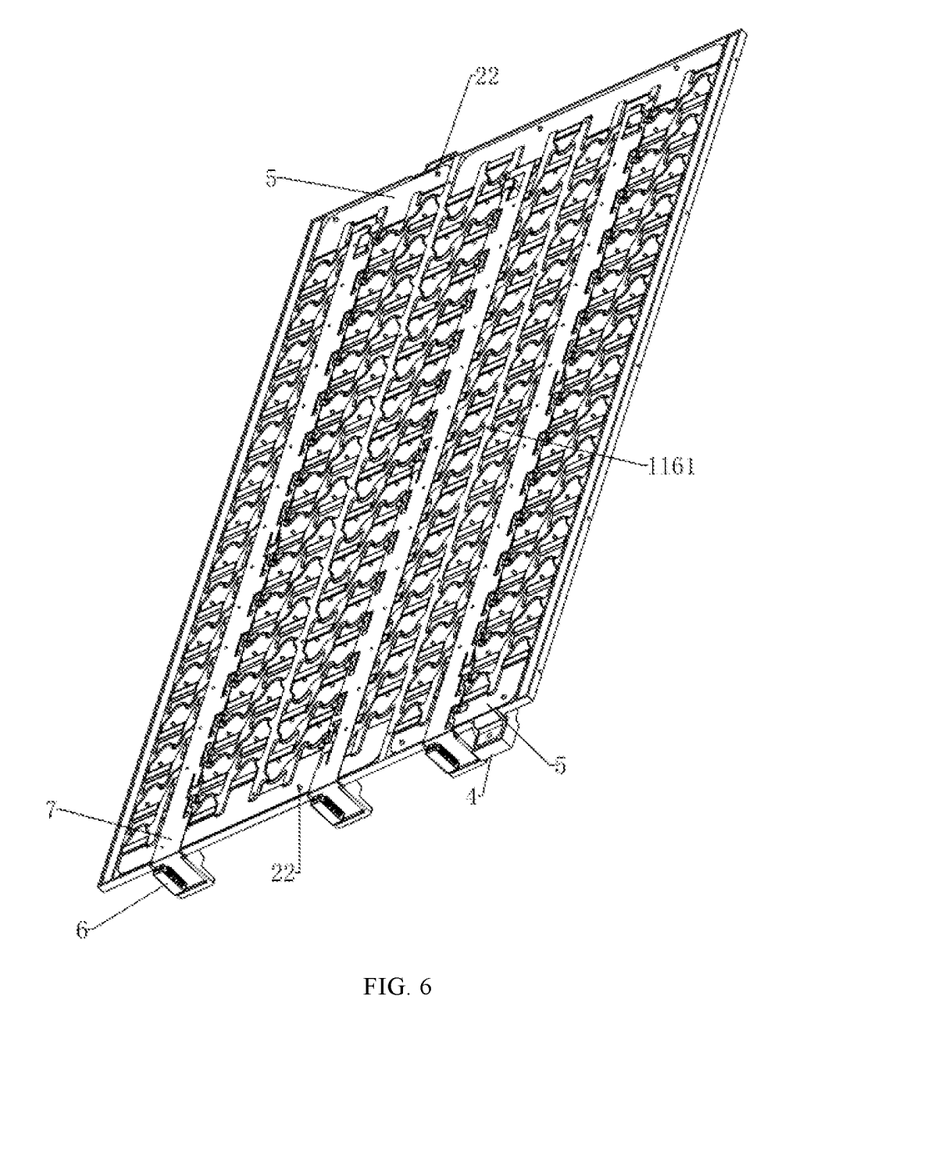
FIG. 6 is a schematic structural diagram of another wire harness isolation plate provided by an embodiment of the present disclosure.

Optionally, the wire harness isolation board further includes a third fixed unit 3 connected to the first fixed plate 11. The third fixed unit 3 is configured to fix the connector 6, as shown in FIG. 6. The flexible circuit board 7 is fixed on the third fixed unit 3 by the connector 6, and the flexible circuit board 7 is arranged on a side of the first fixed plate 11 away from the battery cell 100. The third fixed unit 3 is configured to fix the connector 6, so that the flexible circuit board 7 is fixed on the third fixed unit 3. In the embodiment, the wire harness isolation board includes three third fixed units 3, and the three third fixed units 3 are connected to the second fixed unit 2. Each third fixed unit 3 may fix one flexible circuit board 7 through the connector 6. The three third fixed units 3 are spaced along a third direction. In other embodiments, the number of the third fixed units 3 may be determined according to the number of the flexible circuit boards 7. Optionally, the third fixed unit 3 may be fixed on the second fixed unit 2 on either side of the first fixed plate 11 or may also be fixed on the first fixed plate 11.

Optionally, each third fixed unit 3 includes a third fixed plate 31 fixed on the first fixed plate 11, and the connector 6 is clamped to the third fixed plates 31. In the embodiment, the third fixed plate 31 is directly connected to the second fixed plate 21, and is indirectly connected to the first fixed plate 11 through the second fixed plate 21. The third fixed plate 31 is perpendicular to the first fixed plate 11. The connector 6 is clamped to the third fixed plate 31, and the connector 6 is connected to a side of the third fixed plate 31 away from the battery cell 100. In other embodiments, the third fixed plate 31 may also be disposed in an included angle with the first fixed plate 11. As shown in FIG. 1, the third fixed plate 31 is provided with a structure of a buckle 32, and the connector 6 are clamped to the third fixed plate 31 through the buckle 32, so as to avoid fasteners such as bolts, resulting in easier installation.

Optionally, the first fixed plate 11 is connected to a fourth fixed plate 4, and the output-stage conductive bar 5 is extend to the fourth fixed plate 4. In the embodiment, the fourth fixed plate 4 is directly and fixedly connected to the second fixed plate 21, and is indirectly connected to the first fixed plate 11 through the second fixed plate 21. The fourth fixed plate 4 is embedded with a fastener 41. In the embodiment, the fastener 41 is a nut. The battery modules may be connected in series by a threaded connection that a screw is threaded through the fastener 41 embedded in the fourth fixed plate 4, and the connection is convenient and reliable, thereby reducing the assembly process and improving the production efficiency. The fourth fixed plate 4 may be a plastic plate, and the fastener 41 may be molded on the fourth fixed plate 4. In other embodiments, the fastener 41 may be a stud.

Optionally, the first fixed plate 11 is provided with an installation hole 1161, and the installation hole 1161 is configured to fix an upper cover of the battery module. The upper cover may be directly riveted with the installation hole 1161 to realize the fixing of the upper cover. This fixing is not only economical, but also fast and efficient. Optionally, after installing the wire harness isolation plate and the battery cell module, the upper cover of the battery module is fixed to the wire harness isolation plate by installing the fasteners on the installation holes 1161. As shown in FIG. 1, the first fixed plate 11 is provided with a mounting platform 116, and the installation hole 1161 is arranged on the mounting platform 116.

Optionally, the first fixed unit 1, the second fixed unit 2, and the third fixed unit 3 are integrated. In the embodiment, the first fixed plate 11, the second fixed plate 21, the third fixed plate 31 and the fourth fixed plate 4 are integrated. A material of the wire harness isolation plate may be plastic, such as a raw material of polycarbonate (PC) and acrylonitrile butadiene styrene (ABS).

What is claimed is:

1. A wire harness isolation plate, wherein the wire harness isolation plate is disposed on a battery cell module, the battery cell module comprises a plurality of battery cells and a plurality of busbars, each of the busbars is configured to connect with at least two battery cells in the battery cell module, and a first electrode and a second electrode of each of the battery cells is disposed on a same side of the battery cells; wherein the wire harness isolation plate comprises a first fixed unit, the first fixed unit comprises a first fixed plate, a first side of the first fixed plate is configured to position the busbars, a second side of the first fixed plate is configured to position an end of each of the battery cells provided with the first electrode and the second electrode— and to expose a part of the first electrode and a part of the second electrode—of each of the battery cells, wherein a plurality of busbar limit slots are defined on a first side of the first fixed plate, and the plurality of busbar limit slots are configured to position the busbars, and the first fixed unit further comprises a first positioning column disposed on a bottom of each of the busbar limit slots, and a first mounting hole is defined on each of the busbars for sleeving on the first positioning column; or the first fixed unit further comprises a positioning hole defined on the bottom of each of the busbar limit slots, each of the busbars is provided with a mounting column, and the positioning hole is configured to be sleeved on the mounting column.

2. The wire harness isolation plate of claim 1, wherein a plurality of battery cell limit slots are defined on the second side of the first fixed plate, each of the battery cell limit slots is configured to position a corresponding one of the battery cells, and further to position an end of the corresponding one of the battery cells provided with the first electrode and the second electrode-, and a notch shape of each battery cell limit slot is matched with a shape of an end of each of the battery cells provided with the first electrode and the second electrode.

3. The wire harness isolation plate of claim 2, wherein a gap is defined on a bottom of the battery cell limit slot, a part of the second electrode of each of the battery cells disposed in the battery cell limit slot is exposed from the gap, wherein the bottom of the battery cell limit slot is connected with a first isolation portion, a through hole is defined on the first isolation portion, and the through hole is configured to expose the first electrode of each of the battery cells disposed in the battery cell limit slot.

4. The wire harness isolation plate of claim 2, wherein each of the battery cells is a cylindrical battery cell, and a shape of the battery cell limit slot is circular or arcuate.

5. The wire harness isolation plate of claim 4, wherein an internal diameter of the battery cell limit slot is greater than an external diameter of each of the battery cells.

6. The wire harness isolation plate of claim 1, wherein a rib is arranged between adjacent busbar limit slots.

7. The wire harness isolation plate according to claim 1, further comprising a second fixed unit, wherein the second fixed unit is connected to the first fixed plate, and the second fixed unit is configured to fix an output-stage conductive bar connected to the plurality of busbars.

8. The wire harness isolation plate of claim 7, wherein the second fixed unit comprises a second fixed plate connected to the first fixed plate, the second fixed plate is configured to fix the output-stage conductive bar, the second fixed unit further comprises a second positioning column fixed on the second fixed plate, and a second mounting hole is defined on the output-stage conductive bar for sleeving on the second positioning column.

9. The wire harness isolation plate of claim 7, further comprising a third fixed unit, wherein the third fixed unit-is connected to the first fixed plate, the third fixed unit is configured to fix a connector, and the third fixed unit is configured to fix a flexible circuit board by the connector, wherein a side of the first fixed plate away from the battery cells is configured to dispose the flexible circuit board.

10. The wire harness isolation plate of claim 9, wherein the third fixed units comprise a third fixed plate fixed on the first fixed plate, and the third fixed plate is configured to clamp the connector.

11. The wire harness isolation plate of claim 7, wherein the first fixed plate is connected with a fourth fixed plate, the output-stage conductive bar connected with the plurality of busbars is extended to the fourth fixed plate, and the fourth fixed plate is embedded with a fastener.

12. The wire harness isolation plate of claim 1, wherein the first fixed plate is provided with an installation hole, and the installation holes are configured to fix an upper cover of a battery module.

13. The wire harness isolation plate of claim 1, further comprising:
   a second fixed unit, wherein the second fixed unit is connected to the first fixed plate, the second fixed unit is configured to fix an output-stage conductive bar connected to the plurality of busbars; and
   a third fixed unit, wherein the third fixed unit is connected to the first fixed plate, the third fixed unit is configured to fix a connector, the third fixed unit is further configured to fix a flexible circuit board by the connector, and a side of the first fixed plate away from the battery cells is configured to dispose the flexible circuit board;
   wherein the first fixed unit, the second fixed unit and the third fixed unit are integrated.

14. A battery module, comprising a wire harness isolation plate, and a plurality of battery cells, a busbar, an output-stage conductive bar, a flexible circuit board, and a connector, wherein a battery cell module, the busbar, the output-stage conductive bar, the flexible circuit board, and the connector are arranged on the wire harness isolation plate; wherein the busbars is configured to connect with at least two battery cells in the battery cell module, and a first electrode and a second electrode of each of the battery cells is disposed on a same side of the battery cells; wherein the wire harness isolation plate comprises a first fixed unit, the first fixed unit comprises a first fixed plate, a first side of the first fixed plate is configured to position the busbar, a second side of the first fixed plate is configured to position an end of each of the battery cells provided with the first electrode and the second electrode and to expose a part of the first electrode and a part of the second electrode of each of the battery cells,
   wherein a plurality of busbar limit slots are defined on a first side of the first fixed plate, and each of the plurality of busbar limit slots is configured to position the busbar, and
   the first fixed unit further comprises a first positioning column disposed on a bottom of each of the busbar limit slots, and a first mounting hole is defined on the busbar for sleeving on the first positioning column; or
   the first fixed unit further comprises a positioning hole defined on the bottom of each of the busbar limit slots, the busbar is provided with a mounting column, and the positioning hole is configured to be sleeved on the mounting column.

15. The battery module of claim 14, wherein a plurality of battery cell limit slots are defined on the second side of the first fixed plate, each of the battery cell limit slots is configured to position a corresponding one of the battery cells, and further to position an end of the corresponding one of the battery cells provided with the first electrode and the second electrode, and a notch shape of the battery cell limit slot is matched with a shape of an end of each of the battery cells provided with the first electrode and the second electrode.

16. The battery module of claim 15, wherein a gap is defined on a bottom of the battery cell limit slot, a part of the second electrode of each of the battery cells disposed in the battery cell limit slot is exposed from the gap, wherein the bottom of the battery cell limit slot is connected with a first isolation portion, a through hole is defined on the first isolation portion, and the through hole is configured to expose the first electrode of each of the battery cells disposed in the battery cell limit slot.

17. The battery module of claim 14, wherein a rib is arranged between adjacent busbar limit slots.

18. A wire harness isolation plate, wherein the wire harness isolation plate is disposed on a battery cell module, the battery cell module comprises a plurality of battery cells and a plurality of busbars, each of the busbars is configured to connect with at least two battery cells in the battery cell module, and a first electrode and a second electrode—of each of the battery cells is disposed on a same side of the battery cells; wherein the wire harness isolation plate comprises a first fixed unit, the first fixed unit comprises a first fixed plate, a first side of the first fixed plate is configured to position the busbars, a second side of the first fixed plate is configured to position an end of each of the battery cells provided with the first electrode and the second electrode— and to expose a part of the first electrode and a part of the second electrode of each of the battery cells,
   wherein the wire harness isolation plate further comprises a second fixed unit, the second fixed unit is connected to the first fixed plate, and the second fixed unit is configured to fix an output-stage conductive bar connected to the plurality of busbars, and
   the second fixed unit comprises a second fixed plate connected to the first fixed plate, the second fixed plate is configured to fix the output-stage conductive bar, the second fixed unit further comprises a second positioning column fixed on the second fixed plate, and a second mounting hole is defined on the output-stage conductive bar for sleeving on the second positioning column.

19. The wire harness isolation plate of claim 18, wherein a plurality of battery cell limit slots are defined on the second side of the first fixed plate, each of the battery cell limit slots is configured to position a corresponding one of the battery cells, and further to position an end of the corresponding one of the battery cells provided with the first electrode and the second electrode-, and a notch shape of each of the battery cell limit slots is matched with a shape of an end of each of the battery cells provided with the first electrode and the second electrode.

20. The wire harness isolation plate of claim 19, wherein a gap is defined on a bottom of each of the battery cell limit slots, a part of the second electrode of each of the battery cells disposed in the battery cell limit slots is exposed from the gap, wherein the bottom of the battery cell limit slots is connected with a first isolation portion, a through hole is defined on the first isolation portion, and the through hole is configured to expose the first electrode of each of the battery cells disposed in the battery cell limit slots.

* * * * *